(12) United States Patent
Kitahara

(10) Patent No.: US 8,472,960 B2
(45) Date of Patent: Jun. 25, 2013

(54) WIRELESS COMMUNICATION TERMINAL AND WIRELESS COMMUNICATION METHOD FOR CONTROLLING HANDOVER BASED ON HANDOVER HISTORY

(75) Inventor: Minako Kitahara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 179 days.

(21) Appl. No.: 13/121,357

(22) PCT Filed: Sep. 28, 2009

(86) PCT No.: PCT/JP2009/066818
§ 371 (c)(1),
(2), (4) Date: Mar. 28, 2011

(87) PCT Pub. No.: WO2010/035843
PCT Pub. Date: Apr. 1, 2010

(65) Prior Publication Data
US 2011/0177819 A1    Jul. 21, 2011

(30) Foreign Application Priority Data

Sep. 29, 2008  (JP) ................................. 2008-250644

(51) Int. Cl.
*H04W 36/00* (2009.01)
(52) U.S. Cl.
USPC ............ 455/437; 455/436; 370/332; 370/331
(58) Field of Classification Search
USPC ........................... 455/436–444; 370/331–334
See application file for complete search history.

(56) References Cited

U.S. PATENT DOCUMENTS

| 6,393,282 | B1 * | 5/2002 | Iimori ........................ 455/432.1 |
| 7,072,655 | B2 * | 7/2006 | Ikeda et al. ................... 455/436 |
| 2002/0042273 | A1 * | 4/2002 | Sasaki et al. .................. 455/442 |
| 2002/0119779 | A1 * | 8/2002 | Ishikawa et al. ............... 455/437 |
| 2003/0142647 | A1 * | 7/2003 | Agrawal et al. ............... 370/331 |

(Continued)

FOREIGN PATENT DOCUMENTS

| JP | 07-298333 A | 11/1995 |
| JP | 2001-128210 A | 5/2001 |
| JP | 2004-040338 A | 2/2004 |
| JP | 2005-020458 A | 1/2005 |

OTHER PUBLICATIONS

International Search Report dated Dec. 8, 2009 issued by the Japanese Patent Office for International Application No. PCT/JP2009/066818.

*Primary Examiner* — Allahyar Kasraian
(74) *Attorney, Agent, or Firm* — Procopio, Cory, Hargreaves & Savitch LLP

(57) ABSTRACT

A wireless communication terminal performs normal handover by selecting one among a plurality of base stations to connect to based on a predetermined condition in relation to a received power level of a signal received has a measuring unit for measuring received power levels of signals from the plurality of base stations at every first predetermined time, a handover history memory unit for storing a history of the handover, and a control unit, if it is determined that handover is repeated between a first base station and a second base station within a second predetermined time, for controlling to connect to a base station with a smaller variation of the received power level between the first base station and the second base station if the predetermined condition is satisfied between the received power level from the first base station and the received power level from the second base station.

7 Claims, 3 Drawing Sheets

U.S. PATENT DOCUMENTS

| | | | |
|---|---|---|---|
| 2004/0185851 A1* | 9/2004 | Nagai | 455/436 |
| 2004/0264412 A1 | 12/2004 | Arimitsu | |
| 2004/0266474 A1* | 12/2004 | Petrus | 455/525 |
| 2007/0129096 A1* | 6/2007 | Okumura et al. | 455/522 |
| 2007/0217384 A1 | 9/2007 | Mitani | |
| 2007/0270149 A1* | 11/2007 | Yanagihara | 455/436 |
| 2008/0076423 A1* | 3/2008 | Lee et al. | 455/436 |
| 2009/0247093 A1* | 10/2009 | Saito | 455/73 |
| 2009/0264088 A1* | 10/2009 | Li et al. | 455/114.2 |
| 2009/0274118 A1* | 11/2009 | De Sanctis et al. | 370/331 |
| 2010/0020764 A1* | 1/2010 | Yamamoto et al. | 370/331 |
| 2010/0142486 A1* | 6/2010 | Wahlqvist et al. | 370/332 |
| 2010/0291931 A1* | 11/2010 | Suemitsu et al. | 455/436 |
| 2011/0105126 A1* | 5/2011 | Liang et al. | 455/437 |

\* cited by examiner

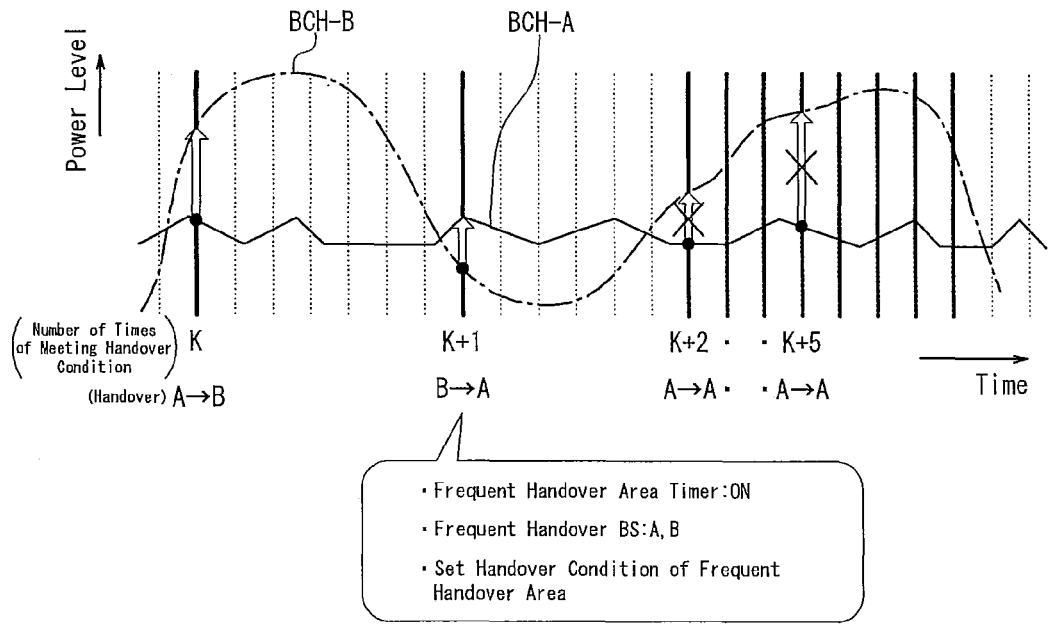

WIRELESS COMMUNICATION TERMINAL AND WIRELESS COMMUNICATION METHOD FOR CONTROLLING HANDOVER BASED ON HANDOVER HISTORY

CROSS REFERENCE TO RELATED APPLICATION

This application claims priority to and the benefit of Japanese Patent Application No. 2008-250644 (filed on Sep. 29, 2008), the entire contents of which are incorporated herein by reference.

TECHNICAL FIELD

The present invention relates to wireless communication terminals and wireless communication methods, and more specifically, to wireless communication terminals and wireless communication methods for appropriately controlling handover, when handover is performed according to a received power level from a base station, even under a circumstance that frequent handover occurs between base stations due to being located at a cell edge and the like.

In a mobile communication system for such as a mobile phone, handover is performed to change a base station (cell) as a communication counterpart in accordance with a movement of a mobile communication terminal (wireless communication terminal). At this time, the mobile communication terminal generally performs handover by determining a base station providing the good communication quality based on a received power from the base station, a transmission loss of a received channel, Signal-Interference Power Ratio and the like. That is, if a received power level of a pilot channel from a base station reaches a predetermined threshold in accordance with the movement of the terminal, the mobile communication terminal simultaneously communicates with the cell as well as a cell currently in communication. If the received power level from the cell currently in communication is deteriorated, the mobile communication terminal controls to disconnect from the cell. However, when handover stated above is performed, bustle (connection to and disconnection from cells) occurs frequently in an area overlapped by numerous cells. In order to solve such a problem, there is disclosed a conventional art to reduce bustles in handover by controlling transmission power, for example (see Patent Document 1, for example).

RELATED ART

Patent Document

Patent Document 1: Japanese Patent Laid-Open No. 7-298333

SUMMARY OF INVENTION

Technical Problem

However, the method described in Patent Document 1 performs handover with reference only to the received power level at a terminal side. Therefore, there is a problem that the terminal performs handover once the received power level becomes equal to or higher than the predetermined threshold even if the terminal is located at the cell edge and in an unstable state with fluctuation of the received power level from the base station of the edge in accordance with the movement of the terminal, which leads to frequent handover between base stations. Moreover, throughput of overall communication system is deteriorated due to loads of handover processing by the base station and the terminal.

Accordingly, in order to solve the above problems, an object of the present invention is to provide a scheme (wireless communication terminal and communication control method), when handover is performed according to a received power level, to prevent deterioration of the throughput of the overall communication system by appropriately controlling handover even under the circumstance that frequent handover occurs between base stations due to being located at the cell edge and the like.

Solution to Problem

In order to solve the above problems, a wireless communication terminal according to the present invention for performing normal handover (handover to a base station which transmits a signal with a highest received power level) by selecting a base station to connect to among a plurality of base stations based on a predetermined condition related to a received power level of a signal received includes:

a measuring unit for measuring received power levels of signals received from the plurality of base stations (at every first predetermined time);

a handover history memory unit for storing a history of the handover (measured received power levels of the plurality of base stations, execution time of handover, a number of execution times, a base station of a handover destination and a base station of a handover source); and a control unit, if it is determined based on the history of the handover that handover is repeated (within a second predetermined time) between a first base station and a second base station, for controlling to connect to a base station with a smaller variation of the received power level between the first base station and the second base station if the predetermined condition is satisfied between the received power level from the first base station and the received power level from the second base station.

In addition, a wireless communication terminal according to one embodiment of the present invention further includes a received power level memory unit for storing the received power level measured by the measuring unit for each of the plurality of base stations, wherein the control unit controls to connect to a base station with a smaller variation of the received power level between the first base station and the second base station based on the received power levels stored in the received power level memory unit.

Moreover, a wireless communication terminal according to another embodiment of the present invention further includes a timer activated if it is determined that handover is repeated (within the second predetermined time) between the first base station and the second base station and a base station information memory unit for storing information on the base station with the smaller variation of the received power level, wherein the control unit, during activation of the timer, for controlling to connect to the base station whose information is stored in the base station information memory unit if the predetermined condition is satisfied between the received power level from the first base station and the received power level from the second base station.

A wireless communication terminal according to another embodiment of the present invention further includes a timer activated if it is determined that handover is repeated (within the second predetermined time) between the first base station and the second base station, wherein the control unit, during activation of the timer, for controlling to connect to a base station with a higher received power between the first base station and the second base station if a difference between the received power level from the first base station and the received power level from the second base station is equal to or over a predetermined threshold.

A wireless communication terminal according to another embodiment of the present invention further includes a timer activated if it is determined that handover is repeated (within the second predetermined time) between the first base station and the second base station, wherein the measuring unit, during activation of the timer, makes an interval (at every first predetermined time) for measuring the received power level of the signals from the plurality of base stations longer than that during inactivation of the timer.

A wireless communication terminal according to another embodiment of the present invention, wherein the timer is stopped when variations of the received power levels from the first base station and the second base station measured by the measuring unit fall within a predetermined range.

In the above description, the means for solving the problem according to the present invention has been discussed as apparatus. However, the present invention can also be implemented as a method, a program, and a recording medium for storing the program substantially corresponding to such apparatus. Therefore it will be understood that such variations are considered to fall within the scope of the invention. Each step of the methods and programs uses an arithmetic processing unit such as a CPU, a DSP and the like in processing the data, as appropriate, while storing input data and processed or generated data in a storage device such as an HDD, a memory and the like.

For example, as a method implementing the present invention, a wireless communication method of a wireless communication terminal for performing normal handover (handover to a base station which transmits a signal with a highest received power level) by selecting a base station to connect to among a plurality of base stations based on a predetermined condition related to a received power level of a signal received includes the steps of:

measuring received power levels of signals received from the plurality of base stations (at every first predetermined time);

storing a history of the handover (measured received power levels of the plurality of base stations, execution time of handover, a number of execution times, a base station of a handover destination and a base station of a handover source); and controlling, if it is determined based on the history of the handover that handover is repeated (within a second predetermined time) between a first base station and a second base station, to connect to a base station with a smaller variation of the received power level between the first base station and the second base station if the predetermined condition is satisfied between the received power level from the first base station and the received power level from the second base station.

Effect of the Invention

According to the present invention, as stated above, when handover is performed according to a received power level, it is possible to prevent deterioration of throughput of overall communication system by appropriately controlling handover even under a circumstance that frequent handover occurs between base stations due to the terminal being located at a cell edge and the like.

BRIEF DESCRIPTION OF DRAWINGS

FIG. 3 is a diagram illustrating a concrete example of handover according to the present invention.

DESCRIPTION OF EMBODIMENT

A wireless communication terminal according to one embodiment of the present invention will be described in detail with reference to the accompanying drawings. It is to be noted that the wireless communication terminal may be any mobile electronics device such as a mobile phone terminal, a notebook computer, a PDA (Personal Digital Assistance), a mobile game machine, a mobile audio player, a mobile video player, a mobile electronic dictionary, a mobile electronic book reader, and the like.

Figure 1:
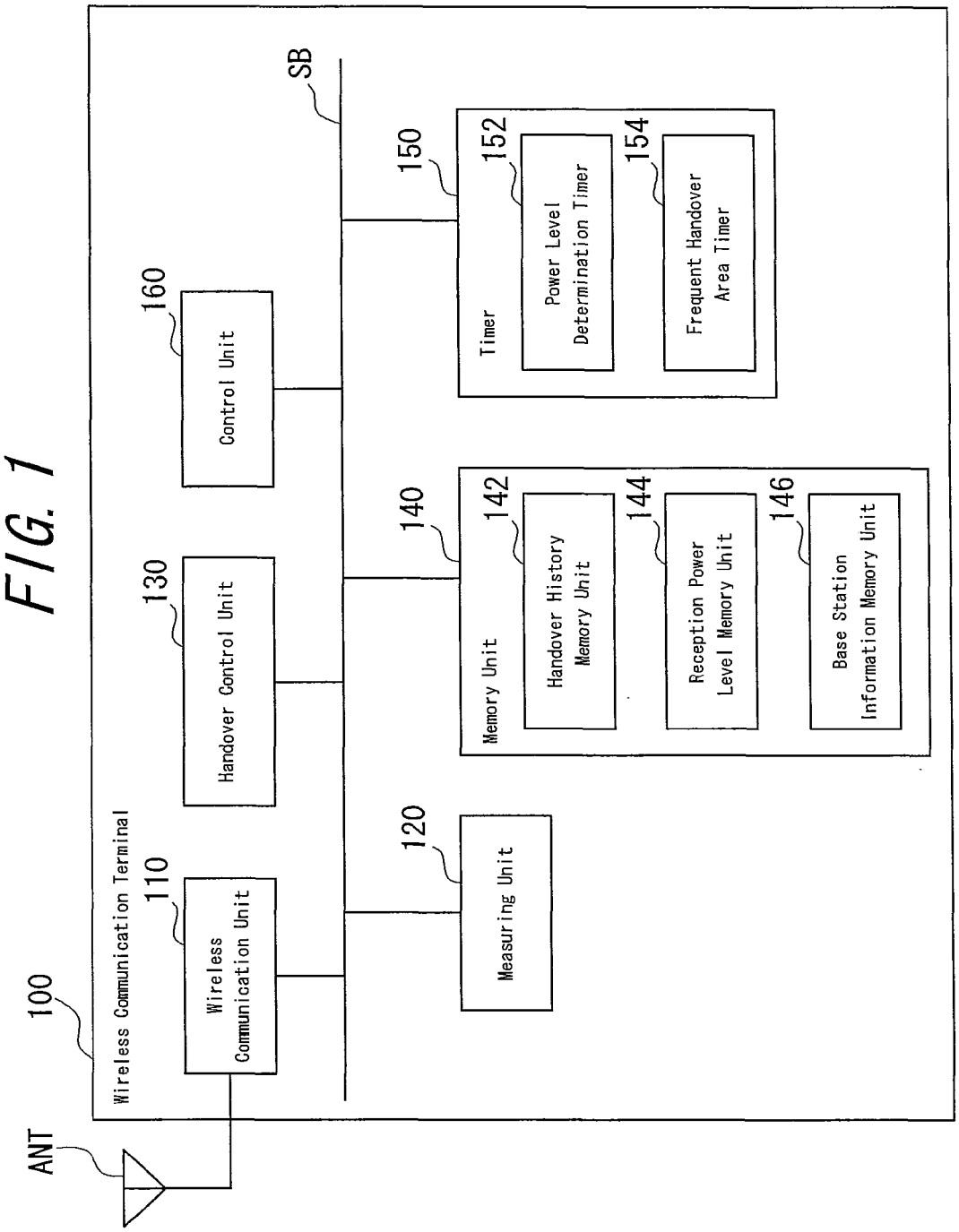
FIG. 1 is a schematic block diagram of a wireless communication terminal according to one embodiment of the present invention.

FIG. 1 is a schematic block diagram of a wireless communication terminal according to one embodiment of the present invention. A wireless communication terminal 100 has a wireless communication unit 110, a measuring unit 120, a handover control unit 130, a memory unit 140, a timer 150, a control unit 160, an antenna ANT and a system bus SB. Additionally, the memory unit 140 has a handover history memory unit 142, a received power level memory unit 144 and a base station information memory unit 146. The timer 150 has a power level determination timer 152 and a frequent handover area timer 154.

First, a function of each unit is briefly described. The wireless communication unit 110 transmits and receives signals from/to a plurality of base stations via the antenna ANT. The measuring unit 120, at every predetermined time (first predetermined time), measures received power levels of signals over broadcast channels (BCH) and the like received from the plurality of base stations. The first predetermined time is measured by the power level determination timer 152. The handover control unit 130 controls whether to perform handover and determines the frequency wherein the wireless communication terminal alternately performed handover between a couple of base stations. The handover history memory unit 142 stores a handover history such as the received power levels of the plurality of base stations measured, execution time of handover, a number of execution times, a base station of a handover destination and a base station of a handover source. The received power level memory unit 144 stores the received power level from each base station measured by the measuring unit 120. If handover is performed frequently between the couple of base stations, the base station information memory unit 146 stores information on one of the base stations to which the handover should be performed. The frequent handover area timer 154 is activated if the handover control unit 130 determines that handover is performed frequently and continues measuring time during frequent handover between the couple of base stations. In addition, the control unit 160 is responsible for control of each unit.

Figure 2:
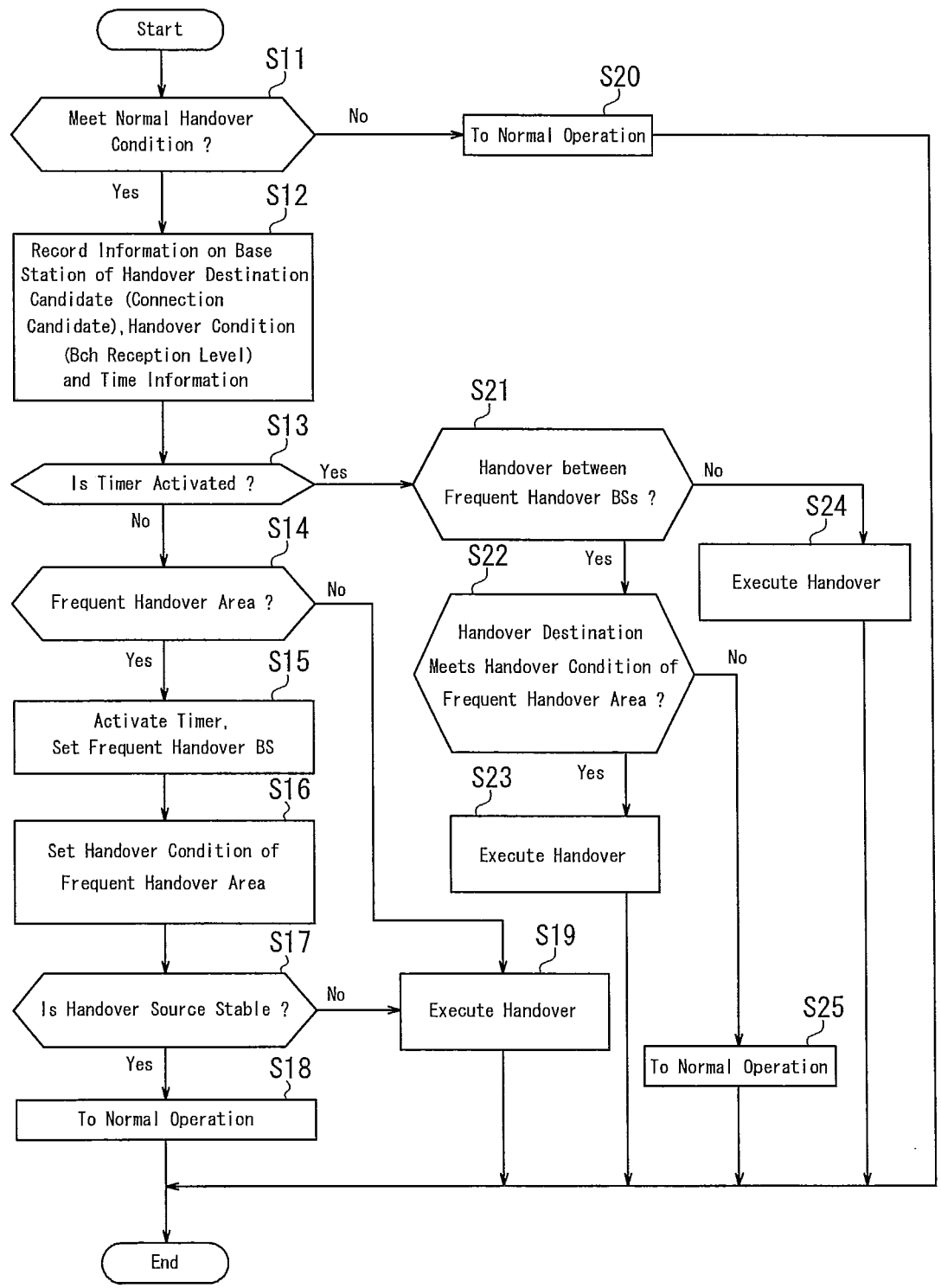
FIG. 2 is a flowchart illustrating an exemplary processing by a wireless communication terminal 100 according to the present invention.

Next, processing by the wireless communication terminal 100 according to the present invention is described with reference to a flowchart. FIG. 2 is a flowchart illustrating exemplary processing by the wireless communication terminal 100 according to the present invention.

First, in the wireless communication terminal 100, in order to perform normal handover according to a received power level of a signal received from a base station, the measuring unit 120 measures the received power levels of the broadcast channels (BCH) received from the plurality of base stations at every predetermined time (first predetermined time). The received power level from each base station measured by the measuring unit 120 is stored in the received power level memory unit 144. Then, the handover control unit 130 determines whether the received power levels measured by the measuring unit 120 meet a normal handover condition (predetermined condition) (step S11). Here, the normal handover represents handover to the base station transmitting a signal with a highest received power level, and the normal handover condition indicates that there is another base station with a received power level higher than that from the base station with which the terminal is currently in communication (connection). That is, at step S11, the handover control unit 130 determines whether there is a base station with a measured power level higher than the base station currently in communication.

If there is no base station meeting the normal handover condition, the processing proceeds to step S20, where the handover control unit 130 maintains communication with the base station currently in communication without performing handover (normal operation). If it is determined at step S11 that the normal handover condition is satisfied, the processing proceeds to step S12, where the handover control unit 130 stores the handover history in the handover history memory unit 142. The handover history includes a number of times meeting the normal handover condition, time meeting the normal handover condition, the received power level (BCH received power level) of each base station when the normal handover condition is met, the base station of the handover destination and the base station of the handover source, and the like. It is to be noted that the handover history stored in the handover history memory unit 142 may be cleared once in a day (24 hours) or in a case that the normal handover condition is met less frequently.

Next, it is determined at step S13 whether the timer is being activated. Although a detail description will be presented below, this timer is activated if the wireless communication terminal 100 is located in an area where frequent handover occurs alternately between a couple of base stations (two base stations). If it is determined at step S13 that the timer is inactivated, the processing proceeds to step S14, where the handover control unit 130 determines whether the area between the couple of base stations meeting the normal handover condition is the frequent handover area (that is, whether the wireless communication terminal 100 is located at cell edges of the couple of base stations). This may be determined with reference to the handover history stored in the handover history memory unit 142. That is, if the handover control unit 130, with reference to the time meeting the normal handover condition and base stations between which handover is performed (the base station of the handover destination and the base station of the handover source), recognizes that handover is repeated between a couple of base stations within a predetermined time (second predetermined time), it determines the area between the couple of base stations as the frequent handover area. If it is determined that the area is not the frequent handover area, the processing proceeds to step S19, where the handover control unit 130 executes handover. In contrast, if it is determined that the area is the frequent handover area, the processing proceeds to step S15, where the frequent handover area timer 154 is activated. In addition, the couple of base stations determined to have the frequent handover area therebetween are stored in the base station information memory unit 146.

Next, at step S16, the handover control unit 130 determines which one of the couple of base stations determined to have the frequent handover area therebetween has a smaller variation of the received power level, that is, which one of them is more stable. This may be determined with reference to the received power level from each base station measured by the measuring unit 120 and stored in the received power level memory unit 144. Then, the handover control unit 130 defines the base station determined to have the smaller variation of the received power level as the base station to which handover should be performed in the frequent handover area (handover condition of the frequent handover area) and stores information on the base station to which handover should be performed in the base station information memory unit 146. Then, the handover control unit 130, at step S17, determines whether the received power level from the base station currently being in communication (handover source) is more stable than that from the handover destination. If it is determined that the handover source is more stable, the processing proceeds to the normal operation at step S18. In contrast, if it is determined that the handover destination is more stable, the processing proceeds to step S19, where handover to the base station determined as the handover destination is executed.

Next, it is described about handover processing according to the present invention if an area between a couple of base stations is defined as the frequent handover area and the normal handover condition is met between the couple of base stations.

If the area between the couple of base stations is defined as the frequent handover area, it is determined at step S13 that the frequent handover area timer 154 is activated and the processing proceeds to step S21. At step S21, the handover control unit 130, with reference to the base station information memory unit 146, determines whether base stations of the handover destination and the handover source are the base stations of the frequent handover area. If any one of them is not the base station of the frequent handover area, the processing proceeds to step S24 where the normal handover is executed by the handover control unit 130. If the base stations of the handover destination and the handover source are the base stations of the frequent handover area, the processing proceeds to step S22 where the handover control unit 130 determines whether the base station of the handover destination meets the handover condition in the frequent handover area. That is, with reference to the base station information memory unit 146, the handover control unit 130 determines at step S16 whether the base station is the one with a smaller variation of the received power level and thus set as the base station to which handover should be performed in the frequent handover area (handover condition in the frequent handover area).

If the base station of the handover destination meets the handover condition and have the variation of the received power level smaller than that of another base station, handover is executed at step S23. In contrast, if the base station of the handover destination does not meet the handover condition and the base station (handover source) currently in communication is more stable with a variation of the received power level smaller than that of the base station of the handover destination, the processing proceeds to step S25, where the communication with the base station currently in communication is maintained without executing handover.

Next, a concrete example of handover according to the present invention is described with reference to a figure. It is assumed in the following description that frequent handover occurs alternately between a base station A and a base station B and variation of the received power level from the base station A is smaller (more stable) than that from the base station B.

FIG. 3(a) is a graph illustrating the received power levels of the base stations A, B measured by the measuring unit 120. In the graph, a horizontal axis and a vertical axis represent the time and the received power level, respectively, whereas the received power level from the base station A and that from the base station B are represented by BCH-A and BCH-B, respectively. In addition, on the axis of the time, timings indicated by dashed lines represent measuring timings of the received power level by the measuring unit 120, whereas bold lines represent timings of meeting the normal handover condition. That is, at the timings represented by the bold lines, the received power levels of the base station A and the base station B are reversed from that at a previous measuring timings. First, as shown in FIG. 3(a), when the number of times of meeting the normal handover condition is K-th, handover is executed between the base station A and the base station B meeting the normal handover condition. At this time, as shown in FIG. 3(b), the handover history memory unit 142 stores the number of times (K) of meeting (satisfying) the normal handover condition, time meeting the condition (T(K)), the received power level from each base station when the condition was met ($P_A$ (K), $P_B$(K), $P_C$(K) . . . ), as well as the base station of the handover source and the base station of the handover destination (A (handover source)→B (handover destination)) (step S12).

Next, when the number of times of meeting the handover condition is K+1th, the base station A and the base station B meet the normal handover condition. In this case, with reference to the handover history stored in the handover history memory unit 142, the handover control unit 130 obtains a difference between the time meeting the normal handover condition and the previous time meeting the handover condition (T(K+1)−T(K)) and determines that handover is repeated between the base station A and the base station B within a predetermined time (second predetermined time) (step S14). Then, the frequent handover area timer 154 is activated and the handover control unit 130 stores the base stations A, B as Frequent Handover BSs in the base station information memory unit 146 (step S15).

Next, with reference to the received power level memory unit 144, the handover control unit 130 determines which one of the base station A and the base station B has a smaller variation of the received power level. In an example shown in FIG. 3(a), the base station A is defined as the base station to which handover should be performed (handover condition of the frequent handover area) if the normal handover condition is met between the base station A and the base station B, as having the smaller variation of the received power level (step S16). Then, in the example shown in FIG. 3(a), since the base station of the handover destination (base station A) is more stable when the number of times of meeting the handover condition is K+1th, handover is performed from the base station B to the base station A (step S19).

Next, when the number of times of meeting the handover condition is K+2th, the base station A and the base station B meet the normal handover condition. At this time, it is determined at step S13 that the frequent handover area timer 154 is being activated, and the processing proceeds to step S21. Since the base station A and the base station B are stored as the Frequent Handover BSs in the base station information memory unit 146, the handover control unit 130 determines it as handover between the Frequent Handover BSs. Then, the processing proceeds to step S22. At step S22, the handover control unit 130 determines whether the base station of the handover destination meets the handover condition of the frequent handover area. In this case, although the base station B is the handover destination, the base station A with the smaller variation of the received power level is defined as the handover destination in the frequent handover area. Accordingly, it is determined that the base station of the handover destination does not meet the handover condition of the frequent handover area, and the processing proceeds to step S25, where the communication with the base station A currently in communication is maintained.

Then, when the number of times of meeting the normal handover condition is K+3th to K+5th, the normal handover condition is satisfied between the base station A and the base station B. However, by the processing stated above, the communication is maintained with the base station A which is stable with the smaller variation of the received power level.

Although in the above embodiment the handover condition of the frequent handover area is "handover is performed to a base station with a smaller variation of the received power level", the present invention is not limited thereto. In another embodiment, it is possible to define the handover condition of the frequent handover area as "handover is performed to a handover destination if a difference in received power level between the handover destination and a handover source is equal to or higher than a predetermined threshold". In a description with reference to FIG. 3(a), when the number of times of meeting the handover condition, in which base station A and the base station B are already defined as the Frequent Handover BSs, is K+2th and thereafter, the handover control unit 130 performs handover to the base station B if the difference in received power level between the base station A and the base station B is equal to or higher than the predetermined threshold. Thereby, handover is not easily occurred to one of the Frequent Handover BSs and it is possible to avoid frequent handover.

In another embodiment, it is also possible, in the frequent handover area, to make an interval for measuring the received power levels from the plurality of base stations by the measuring unit 120 longer than that for outside the frequent handover area. In the description with reference to FIG. 3(a), when the number of times of meeting the handover condition, in which base station A and the base station B are already defined as the Frequent Handover BSs, is K+2th and thereafter, while the frequent handover area timer 154 is activated, the intervals of timings to measure the power level from the plurality of base stations by the measuring unit 120, represented by the dashed lines, are elongated. Accordingly, it is possible to maintain the communication with a more stable base station by reducing frequency of handover according to the received power level if it is previously known that handover will be frequently performed.

In addition, in the above embodiment, it is preferred that the frequent handover area timer 154 is inactivated when the variation of the received power level from the Frequent Handover BS measured by the measuring unit 120 falls within a predetermined range.

Now, advantages of the present invention are stated once again. According to the wireless communication terminal of the present invention, as stated above, when handover is performed according to the received power level, it is possible to appropriately control handover and thus to maintain the connection to the more stable base station even under a circumstance that frequent handover occurs alternately between base stations because of being located at the cell edge and the like. Accordingly, the present invention prevents frequent handover and thereby capable of reducing processing loads on the base station and the terminal and improving throughput of the communication system overall.

Although the present invention is described based on figures and the embodiments, it is to be understood that those skilled in the art may easily vary or modify in a multiple manner based on disclosure of the present invention. Accordingly, such variation and modification are included in a scope of the present invention. For example, functions included in each component, means and the like can be rearranged avoiding a logical inconsistency, and a plurality of elements can be combined or divided. For example, although the predetermined time (second predetermined time) used for determination of the frequent handover area is obtained from the difference in the handover meeting times with reference to the handover history in the above embodiment, the present invention is not limited thereto but it is also possible to provide a timer for timing the second predetermined time. In addition, not only the broadcast channel but also a paging channel and the like may be used as the signal for measuring the received power level.

REFERENCE SIGNS LIST 100 wireless communication terminal
110 wireless communication unit
120 measuring unit
130 handover control unit
140 memory unit
142 handover history memory unit
144 received power level memory unit
146 base station information memory unit
150 timer
152 power level determination timer
154 frequent handover area timer
160 control unit
ANT antenna
BCH-A received power level from base station A
BCH-B received power level from base station B

The invention claimed is:

1. A wireless communication terminal for performing normal handover by selecting a base station to connect to among a plurality of base stations based on a predetermined condition related to a received power level of a received signal, comprising:
  a measuring unit for measuring received power levels of signals received from the plurality of base stations;
  a handover history memory unit for storing history of handover; and
  a control unit, when it is determined based on the history of the handover that a handover is repeated between a first base station and a second base station, for controlling to connect to one of the first base station and the second base station with a smaller variation of the received power level between the first base station and the second base station when the predetermined condition is satisfied between the received power level from the first base station and the received power level from the second base station.

2. A wireless communication terminal according to claim 1, further comprising a received power level memory unit for storing the received power levels measured by the measuring unit for each of the plurality of base stations, wherein
  the control unit controls to connect to the one of the first base station and the second base station with the smaller variation of the received power level between the first base station and the second base station based on the received power levels stored in the received power level memory unit.

3. A wireless communication terminal according to claim 1, further comprising a timer activated when it is determined that the handover is repeated between the first base station and the second base station and a base station information memory unit for storing information on the base station with the smaller variation of the received power level, wherein
  the control unit, during activation of the timer, for controlling to connect to the base station whose information is stored in the base station information memory unit when the predetermined condition is satisfied between the received power level from the first base station and the received power level from the second base station.

4. A wireless communication terminal according to claim 1, further comprising a timer activated when it is determined that the handover is repeated between the first base station and the second base station, wherein
  the control unit, during activation of the timer, for controlling to connect to the one of the first base station and the second base station with a higher received power between the first base station and the second base station if a difference between the received power level from the first base station and the received power level from the second base station is equal to or over a predetermined threshold.

5. A wireless communication terminal according to claim 3, wherein the measuring unit, during activation of the timer, makes an interval for measuring the received power levels of the signals received from the plurality of base stations longer than that during inactivation of the timer.

6. A wireless communication terminal according to claim 3, wherein the timer is stopped when variations of the received power levels from the first base station and the second base station measured by the measuring unit fall within a predetermined range.

7. A wireless communication method of a wireless communication terminal for performing normal handover by selecting a base station to connect to among a plurality of base stations based on a predetermined condition related to a received power level of a received signal, comprising the steps of:
  measuring received power levels of signals received from the plurality of base stations;
  storing history of handover; and
  controlling, when it is determined based on the history of the handover that a handover is repeated between a first base station and a second base station, to connect to one of the first base station and the second base station with a smaller variation of the received power level between the first base station and the second base station when the predetermined condition is satisfied between the received power level from the first base station and the received power level from the second base station.

* * * * *